(12) United States Patent
Xi et al.

(10) Patent No.: US 9,900,862 B2
(45) Date of Patent: Feb. 20, 2018

(54) ACCESS NETWORK DEVICE AND COMMUNICATION METHOD

(71) Applicant: Huawei Technologies Co., Ltd., Shenzhen (CN)

(72) Inventors: Qinghua Xi, Shanghai (CN); Ming Li, Shanghai (CN); Weiwei Dong, Chengdu (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 0 days.

(21) Appl. No.: 15/386,599

(22) Filed: Dec. 21, 2016

(65) Prior Publication Data

US 2017/0105195 A1    Apr. 13, 2017

Related U.S. Application Data

(63) Continuation of application No. PCT/CN2014/080636, filed on Jun. 24, 2014.

(51) Int. Cl.
*H04W 68/02*    (2009.01)
*H04W 76/02*    (2009.01)
*H04W 88/12*    (2009.01)

(52) U.S. Cl.
CPC ........... *H04W 68/02* (2013.01); *H04W 76/02* (2013.01); *H04W 88/12* (2013.01)

(58) Field of Classification Search
CPC ............................... H04W 68/02; H04W 76/02
See application file for complete search history.

(56) References Cited

U.S. PATENT DOCUMENTS

| | | | |
|---|---|---|---|
| 6,564,049 | B1 | 5/2003 | Dailey |
| 2003/0054863 | A1 | 3/2003 | Lee et al. |
| 2007/0123195 | A1 | 5/2007 | Lv et al. |
| 2007/0192439 | A1 | 8/2007 | Bhaskaran |
| 2009/0017843 | A1* | 1/2009 | Laroia ................ H04W 76/023 455/458 |

FOREIGN PATENT DOCUMENTS

| | | |
|---|---|---|
| CN | 1697544 A | 11/2005 |
| CN | 102215566 A | 10/2011 |
| WO | 9952317 A2 | 10/1999 |

OTHER PUBLICATIONS

Nokia, "Study on Typical Signalling Flows for Alt2 and Alt3," 3GPP TSG-RAN WG3 Meeting #54, R3-061841, Nov. 6-10, 2006, Riga, Latvia, 6 pages.

* cited by examiner

*Primary Examiner* — Christopher M Brandt
(74) *Attorney, Agent, or Firm* — Slater Matsil, LLP

(57) ABSTRACT

Embodiments provide an access network device and a communication method. The access network device includes: a receiver, configured to receive a call request sent by a calling user equipment, where the call request carries a user communication identity of a called user equipment. The access network device also includes a processor, configured to generate a paging request based on the user communication identity before the receiver receives a paging message sent by a core network device, where the processor is further configured to set up a signaling connection to the called user equipment based on the paging request. The access network device also includes a sender, configured to send the paging request generated by the processor to the called user equipment.

20 Claims, 8 Drawing Sheets

ACCESS NETWORK DEVICE AND COMMUNICATION METHOD

CROSS-REFERENCE TO RELATED APPLICATIONS

This application is a continuation of International Patent Application No. PCT/CN2014/080636 filed on Jun. 24, 2014, the disclosure of which is hereby incorporated by reference in its entirety.

TECHNICAL FIELD

The present invention relates to the field of communications, and in particular, to an access network device and a communication method.

BACKGROUND

In a mobile communications network, a voice service setup delay of a calling user equipment and a called user equipment is one of indicators extremely focused by both an operator and a terminal user, where the voice service setup delay mainly refers to a difference between a time at which the calling user equipment initiates a call request and a time at which the calling user equipment receives ringing information.

In an existing mobile communications network, when a calling user equipment sets up a voice service with a called user equipment, a core network device needs to deliver an instruction to an access network device according to reported information of the access network device, and then the access network device sets up a signaling connection or a radio service bearer connection to the called user equipment based on the received instruction, and ringing information sent by the called user equipment also needs to be first uploaded to the core network device by using the access network device, and then delivered by the core network device to the calling user equipment by using the access network device.

However, in an existing communications system, for information exchange in a process of setting up a voice service between a calling user equipment (UE) and a called UE, serial processing in an access network-core network-access network manner needs to be performed, so that a voice service setup delay is relatively long, which affects service experience of a user.

SUMMARY

The present invention provides an access network device and a communication method, so as to solve a technical problem in the prior art that service experience of a user is affected due to a relatively long voice service setup delay.

According to a first aspect, an access network device is provided. The access network device includes a receiver, configured to receive a call request sent by a calling user equipment, where the call request carries a user communication identity of a called user equipment. The access network device also includes a processor, configured to generate a paging request based on the user communication identity before the receiver receives a paging message sent by a core network device, where the processor is further configured to set up a signaling connection to the called user equipment based on the paging request; and a sender, configured to send the paging request generated by the processor to the called user equipment.

With reference to the first aspect, in a first possible implementation manner, the processor is further configured to determine, based on the user communication identity, a target radio network controller with which the called user equipment communicates; and that the sender is configured to send the paging request generated by the processor to the called user equipment includes that: the sender is configured to: when the target radio network controller with which the called user equipment communicates and a calling radio network controller with which the calling user equipment communicates are a same radio network controller, send the paging request generated by the processor to the called user equipment, where the access network device is the calling radio network controller.

With reference to the first aspect or the first possible implementation manner of the first aspect, in a second possible implementation manner, the receiver is further configured to: before receiving ringing information sent by the core network device, receive the ringing information sent by the called user equipment; and the sender is further configured to send the ringing information to the calling user equipment before the receiver receives the ringing information sent by the core network device.

With reference to the first aspect or the first or the second possible implementation manner of the first aspect, in a third possible implementation manner, the receiver is further configured to receive an instruction that is sent by the core network device and that instructs the access network device to set up a radio service bearer connection to the called user equipment; the processor is further configured to set up a signaling connection to the called user equipment, and generate a radio service bearer connection message before the receiver receives the instruction of setting up a radio service bearer connection; the sender is further configured to send the radio service bearer connection message generated by the processor to the called user equipment; and the processor is further configured to set up a radio service bearer connection to the called user equipment based on the radio service bearer connection message.

With reference to the first aspect, in a fourth possible implementation manner, the processor is further configured to determine, based on the user communication identity, a target radio network controller with which the called user equipment communicates; that the sender is configured to send the paging request generated by the processor to the called user equipment includes that: the sender is configured to: when the target radio network controller with which the called user equipment communicates and a calling radio network controller with which the calling user equipment communicates are not a same radio network controller, send the paging request generated by the processor to the target radio network controller, where the paging request is then sent to the called user equipment by using the target radio network controller, and the access network device is the calling radio network controller.

With reference to the first aspect or the fourth possible implementation manner of the first aspect, in a fifth possible implementation manner, the receiver is further configured to: before receiving ringing information sent by the core network device, receive the ringing information sent by the target radio network controller with which the called user equipment communicates; and the sender is further configured to send the ringing information to the calling user equipment before the receiver receives the ringing information sent by the core network device.

With reference to the first aspect or any one of the first possible implementation manner to the fifth possible implementation manner of the first aspect, in a sixth possible implementation manner, that the processor is configured to generate a paging request based on the user communication identity before the receiver receives a paging message sent by a core network device includes that: the processor is configured to acquire, based on the user communication identity of the called user equipment that is carried in the call request, connection state information of the called user equipment before the receiver receives the paging message sent by the core network device, and determine a paging request type corresponding to the connection state information, where the paging request is of the paging request type.

According to a second aspect, an access network device is provided. The access network device includes a receiver, configured to receive a user communication identity of a called user equipment that is sent by a calling radio network controller with which a calling user equipment communicates. The access network device also includes a processor, configured to generate a paging request based on the user communication identity before the receiver receives a paging message sent by a core network device, where the processor is further configured to set up a signaling connection to the called user equipment based on the paging request. The access network device also includes a sender, configured to send the paging request generated by the processor to the called user equipment.

With reference to the second aspect, in a first possible implementation manner, the receiver is further configured to receive an instruction that is sent by the core network device and that instructs the access network device to set up a radio service bearer connection to the called user equipment. the processor is further configured to generate a radio service bearer connection message before the receiver receives the instruction, which is sent by the core network device, of setting up a radio service bearer connection; the sender is further configured to send the radio service bearer connection message generated by the processor to the called user equipment; and the processor is further configured to set up a radio service bearer connection to the called user equipment based on the radio service bearer connection message.

With reference to the second aspect or the first possible implementation manner of the second aspect, in a second possible implementation manner, the receiver is further configured to receive ringing information sent by the called user equipment; and the sender is further configured to send the ringing information to the calling radio network controller before or when sending the ringing information to the core network device, where the access network device is a target radio network controller with which the called user equipment communicates.

According to a third aspect, a communication method is provided. The method includes receiving, by an access network device, a call request sent by a calling user equipment, where the call request carries a user communication identity of a called user equipment. The method also includes generating, by the access network device, a paging request based on the user communication identity before the access network device receives a paging message sent by a core network device. The method also includes sending, by the access network device, the generated paging request to the called user equipment; and setting up, by the access network device, a signaling connection to the called user equipment based on the paging request.

With reference to the third aspect, in a first possible implementation manner, the sending, by the access network device, the generated paging request to the called user equipment includes: determining, by the access network device, based on the user communication identity, a target radio network controller with which the called user equipment communicates; and when the target radio network controller with which the called user equipment communicates and a calling radio network controller with which the calling user equipment communicates are a same radio network controller, sending, by the access network device, the generated paging request to the called user equipment, where the access network device is the calling radio network controller.

With reference to the third aspect or the first possible implementation manner of the third aspect, in a second possible implementation manner, after the setting up, by the access network device, a signaling connection to the called user equipment based on the paging request, the method further includes: before the access network device receives ringing information sent by the core network device, receiving, by the access network device, the ringing information sent by the called user equipment; and sending, by the access network device, the ringing information to the calling user equipment before the access network device receives the ringing information sent by the core network device.

With reference to the third aspect or the first or the second possible implementation manner of the third aspect, in a third possible implementation manner, after the setting up, by the access network device, a signaling connection to the called user equipment based on the paging request, the method further includes: generating, by the access network device, a radio service bearer connection message before the access network device receives an instruction that is sent by the core network device and that instructs the access network device to set up a radio service bearer connection to the called user equipment; sending, by the access network device, the generated radio service bearer connection message to the called user equipment; and setting up, by the access network device, a radio service bearer connection to the called user equipment based on the radio service bearer connection message.

With reference to the third aspect, in a fourth possible implementation manner, the sending, by the access network device, the generated paging request to the called user equipment includes: determining, by the access network device, based on the user communication identity, a target radio network controller with which the called user equipment communicates; and when the target radio network controller with which the called user equipment communicates and a calling radio network controller with which the calling user equipment communicates are not a same radio network controller, sending, by the access network device, the generated paging request to the target radio network controller, and then sending the paging request to the called user equipment by using the target radio network controller, where the access network device is the calling radio network controller.

With reference to the third aspect or the fourth possible implementation manner of the third aspect, in a fifth possible implementation manner, after the setting up, by the access network device, a signaling connection to the called user equipment based on the paging request, the method further includes: before the access network device receives ringing information sent by the core network device, receiving, by the access network device, the ringing information sent by the target radio network controller with which the called user equipment communicates; and sending the ringing information to the calling user equipment before the access network device receives the ringing information sent by the core network device.

With reference to the third aspect or any one of the first possible implementation manner to the fifth possible implementation manner of the third aspect, in a sixth possible implementation manner, the generating, by the access network device, a paging request based on the user communication identity includes: acquiring, by the access network device, based on the user communication identity, connection state information of the called user equipment; determining, by the access network device, a paging request type corresponding to the connection state information; and generating, by the access network device, the paging request based on the called user communication identity, where the paging request is of the paging request type.

According to a fourth aspect, a communication method is provided. The method includes receiving, by an access network device, a user communication identity of a called user equipment that is sent by a calling radio network controller with which a calling user equipment communicates. The method also includes generating, by the access network device, a paging request based on the user communication identity before the access network device receives a paging message sent by a core network device. The method also includes sending, by the access network device, the generated paging request to the called user equipment. The method also includes setting up, by the access network device, a signaling connection to the called user equipment based on the paging request.

With reference to the fourth aspect, in a first possible implementation manner, after the setting up, by the access network device, a signaling connection to the called user equipment based on the paging request, the method further includes: generating, by the access network device, a radio service bearer connection message before the access network device receives an instruction that is sent by the core network device and that instructs the access network device to set up a radio service bearer connection to the called user equipment; sending, by the access network device, the generated radio service bearer connection message to the called user equipment; and setting up, by the access network device, a radio service bearer connection to the called user equipment based on the radio service bearer connection message.

With reference to the fourth aspect or the first possible implementation manner of the fourth aspect, in a second possible implementation manner, after the setting up, by the access network device, a signaling connection to the called user equipment based on the paging request, the method further includes: receiving, by the access network device, ringing information sent by the called user equipment; and sending, by the access network device, the ringing information to the calling radio network controller before and when the access network device sends the ringing information to the core network device, where the access network device is a target radio network controller with which the called user equipment communicates.

In embodiments of the present invention, an access network device actively delivers a message to a calling user equipment or a called user equipment concurrently before receiving an instruction of a core network device, which achieves a technical effect of shortening a voice service setup delay.

BRIEF DESCRIPTION OF THE DRAWINGS

To describe the technical solutions in the embodiments of the present invention or in the prior art more clearly, the following briefly introduces the accompanying drawings required for describing the embodiments. Apparently, the accompanying drawings in the following description show some embodiments of the present invention, and persons of ordinary skill in the art may still derive other drawings from these accompanying drawings without creative efforts.

DETAILED DESCRIPTION OF ILLUSTRATIVE EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

Figure 1:
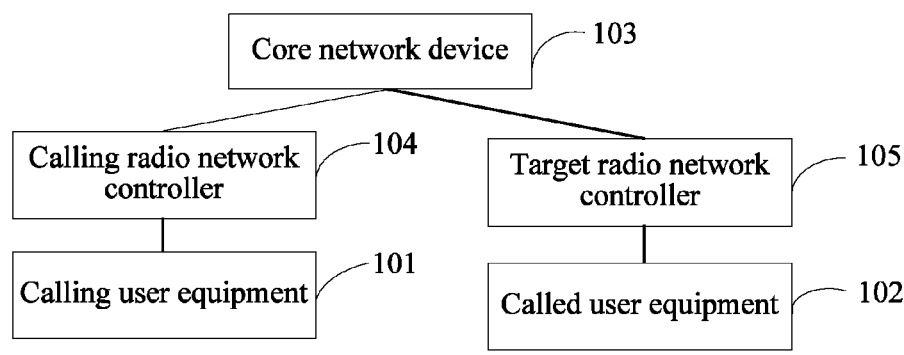
FIG. 1 is a schematic diagram of a system corresponding to a communication method according to an embodiment of the present invention.

Before the embodiments of the present invention are introduced, a system corresponding to a communication method in an embodiment of the present invention is first introduced. As shown in FIG. 1, FIG. 1 shows a communications system that is used to implement a communication method in the present invention. The system includes: a calling user equipment 101, a called user equipment 102, an access network device, and a core network device 103. The access network device may be a calling radio network controller 104 with which the calling user equipment 102 communicates, and may also be a target radio network controller 105 with which the called user equipment 101 communicates; the communications system may be specifically a communication system based on Universal Mobile Telecommunications System (UMTS), a communications system based on Global System for Mobile Communications (GSM), a communications system based on Long Term Evolution (LTE), a communications system based on Code Division Multiple Access (CDMA), a communications system based on Time Division-Synchronous Code Division Multiple Access (TD-SCDMA), or the like, which is not limited in this application.

Embodiment 1

Figure 2:
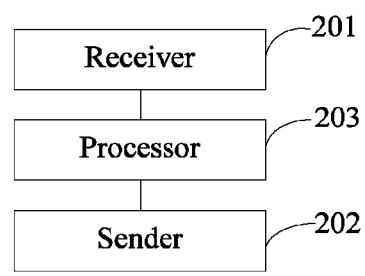
FIG. 2 is a schematic structural diagram of an access network device according to an embodiment of the present invention.

This embodiment provides an access network device, and as shown in FIG. 2, the access network device includes: a receiver 201, configured to receive a call request sent by a calling user equipment, where the call request carries a user communication identity of a called user equipment; a processor 203, configured to generate a paging request based on the user communication identity before the receiver 201 receives a paging message sent by a core network device, where the processor 203 is further configured to set up a signaling connection to the called user equipment based on the paging request; and a sender 202, configured to send the paging request generated by the processor 203 to the called user equipment.

A specific connection relationship is that: the receiver 201 is connected to the processor 203, and the sender 202 is also connected to the processor 203.

After receiving the call request sent by the calling user equipment, the access network device actively pages the called user equipment, so as to start setting up a signaling connection to the called user equipment before the core network device delivers the paging message, which saves duration between a time at which the access network device reports to the core network device and a time at which the core network device delivers the paging message to the access network device, thereby achieving a technical effect of shortening a voice service setup delay.

The access network device introduced in Embodiment 1 is a calling radio network controller with which the calling user equipment communicates.

In the following descriptions, the access network device is used as a calling radio network controller, and two cases, that is, the calling radio network controller and a target radio network controller with which the called user equipment communicates are a same controller, and the calling radio network controller and the target radio network controller are different controllers, are separately described.

A first case is that the calling radio network controller and the target radio network controller are a same controller.

In this embodiment, the processor 203 is further configured to determine, based on the user communication identity, the target radio network controller with which the called user equipment communicates; and the sender 202 is configured to: when the target radio network controller with which the called user equipment communicates and the calling radio network controller with which the calling user equipment communicates are a same radio network controller, send the paging request generated by the processor 203 to the called user equipment.

In this embodiment, the receiver 201 is further configured to receive an instruction that is sent by the core network device and that instructs the access network device to set up a radio service bearer connection to the called user equipment; the processor 203 is further configured to set up a signaling connection to the called user equipment, and generate a radio service bearer connection message before the receiver 201 receives the instruction of setting up a radio service bearer connection; the sender 202 is further configured to send the radio service bearer connection message generated by the processor 203 to the called user equipment; and the processor 203 is further configured to set up a radio service bearer connection to the called user equipment based on the radio service bearer connection message.

Specifically, after the access network device detects that the access network device has set up a signaling connection to the called user equipment, the access network device actively generates the radio service bearer connection message and sends the radio service bearer connection message to the called user equipment, so as to start setting up a radio service bearer connection to the called user equipment before the core network device instructs the access network device to set up a radio service bearer connection to the called user equipment, which saves a time between a time at which the access network device reports to the core network device and a time at which the core network device instructs the access network device to set up a radio service bearer connection to the called user equipment, thereby achieving a technical effect of shortening a voice service setup delay.

In this embodiment, the receiver 201 is further configured to: before receiving ringing information sent by the core network device, receive the ringing information sent by the called user equipment; and the sender 202 is further configured to send the ringing information to the calling user equipment before the receiver 201 receives the ringing information sent by the core network device.

Specifically, when receiving the ringing information sent by the called user equipment, the access network device actively sends the ringing information to the calling user equipment before the core network device deliver the ringing information, which saves a time between a time at which the access network device uploads the ringing information to the core network device and a time at which the core network device delivers the ringing information to the access network device, thereby achieving a technical effect of shortening a voice service setup delay.

A second case is that the calling radio network controller and the target radio network controller are different controllers.

In this embodiment, the processor 203 is further configured to determine, based on the user communication identity, the target radio network controller with which the called user equipment communicates; and that the sender 202 is configured to send the paging request generated by the processor 203 to the called user equipment includes that: the sender 202 is configured to: when the target radio network controller with which the called user equipment communicates and the calling radio network controller with which the calling user equipment communicates are not a same radio network controller, send the paging request generated by the processor 203 to the target radio network controller, where the paging request is then sent to the called user equipment by using the target radio network controller.

In this embodiment, the receiver 201 is further configured to: before receiving ringing information sent by the core network device, receive the ringing information sent by the target radio network controller with which the called user equipment communicates; and the sender 202 is further configured to send the ringing information to the calling user equipment before the receiver 201 receives the ringing information sent by the core network device.

Specifically, after receiving the ringing information sent by the target radio network controller, the access network device actively sends the ringing information to the calling user equipment before the core network device delivers the ringing information, which saves a time of waiting for the core network device to deliver the ringing information, thereby achieving a technical effect of shortening a voice service setup delay.

In this embodiment, what is applicable to both the foregoing first case and second case is that: that the processor 203 is configured to generate a paging request based on the user communication identity before the receiver 201 receives a paging message sent by a core network device includes that: the processor 203 is configured to acquire, based on the user communication identity of the called user equipment that is carried in the call request, connection state information of the called user equipment before the receiver 201 receives the paging message sent by the core network device, and determine a paging request type corresponding to the connection state information, where the paging request is of the paging request type.

Corresponding to the access network device provided above, this embodiment further provides a communication method, where the communication method can be applied to the foregoing access network device.

Figure 3:
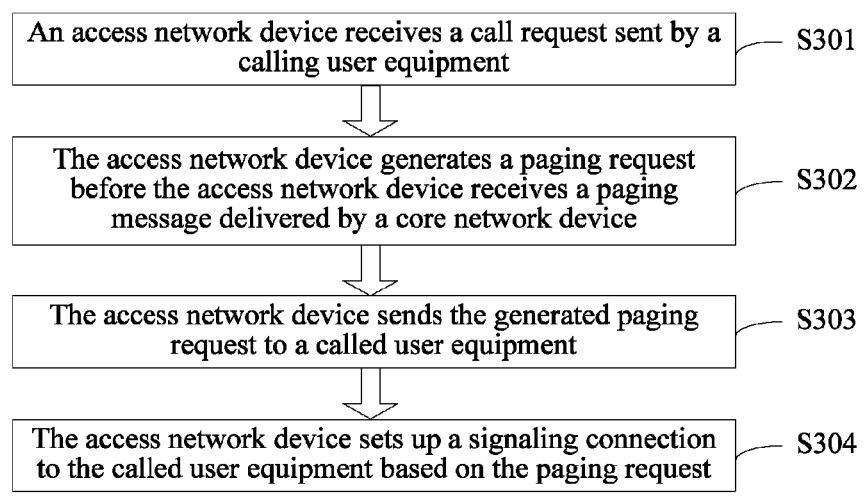
FIG. 3 is a flowchart of a communication method according to an embodiment of the present invention.

As shown in FIG. 3, the communication method includes the following steps.

Step S301: An access network device receives a call request sent by a calling user equipment, where the call request carries a user communication identity of a called user equipment.

Step S302: The access network device generates a paging request based on the user communication identity before the access network device receives a paging message delivered by a core network device.

Step S303: The access network device sends the generated paging request to the called user equipment.

Step S304: The access network device sets up a signaling connection to the called user equipment based on the paging request.

The following describes in detail specific implementation steps of the foregoing communication method.

First, step S301 is performed, that is, the access network device receives the call request sent by the calling user equipment.

In a specific implementation process, before the access network device receives the call request sent by the calling user equipment, the communication method further includes: setting up, by the calling user equipment, a signaling connection to the access network device.

Specifically, the call request is a call request that is used to request to set up a voice service connection to the called user equipment, where the call request carries the communication identity of the called user. Using a UMTS system as an example, a call request in the 3rd Generation Partnership Project (3GPP) protocol is referred to as a Setup message, which includes a user communication identity of a called user. For detailed explanation, reference may be made to the 3Gpp protocol.

After the access network device receives the call request, step S302 is performed, that is, the access network device generates, based on the user communication identity of the called user equipment that is carried in the call request, a paging request before the access network device receives the paging message delivered by the core network device.

In a specific implementation process, the user communication identity may specifically be any one of or a combination of the following: a temporary mobile subscriber identity (TMSI), a packet temperate mobile subscriber identity (P-TMSI), an international mobile subscriber identification number (IMSI), a mobile subscriber international ISDN/PSDN number (MSISDN), and the like.

Specifically, the paging message is a message that is delivered by the core network device to the access network device and that is used to instruct to set up a signaling connection to the called user equipment, and the paging request is a request that is delivered by the access network device to the called user equipment and that is used to request to set up a signaling connection to the called user equipment. Using a UMTS system as an example, in the 3Gpp protocol, a paging message delivered by a core network device to an access network device is referred to as Paging, and a paging request delivered by an access network device to a user equipment is referred to as Paging Type1 or Paging Type2. For detailed explanation, reference may be made to the 3Gpp protocol.

Next, step S303 is performed, that is, the access network device sends the generated paging request to the called user equipment.

Step S304 is performed, that is, the access network device sets up a signaling connection to the called user equipment based on the paging request.

In a specific implementation process, the signaling connection is a connection, which is used to perform information transmission, between the access network device and a user equipment. Using a UMTS as an example, a signaling connection in the 3Gpp protocol is referred to as a radio resource control (RRC) connection. Using a GSM as an example, a process of setting up a signaling connection is a process of performing channel access between an access network device and a user equipment.

Corresponding to the foregoing first case and second case of the access network device in this embodiment, when the access network device is a calling radio network controller, there may also be two cases that: the calling radio network controller and a target radio network controller with which the called user equipment communicates are a same controller, and the calling radio network controller and the target radio network controller are different controllers, which are separately described below.

A first case is that the calling radio network controller and the target radio network controller are a same controller.

That is, in step S303, that the access network device sends the generated paging request to the called user equipment includes that: the access network device determines, based on the user communication identity, the target radio network controller with which the called user equipment communicates; and when the target radio network controller with which the called user equipment communicates and the calling radio network controller with which the calling user equipment communicates are a same radio network controller, the access network device sends the generated paging request to the called user equipment, where the access network device is the calling radio network controller.

Figure 4:
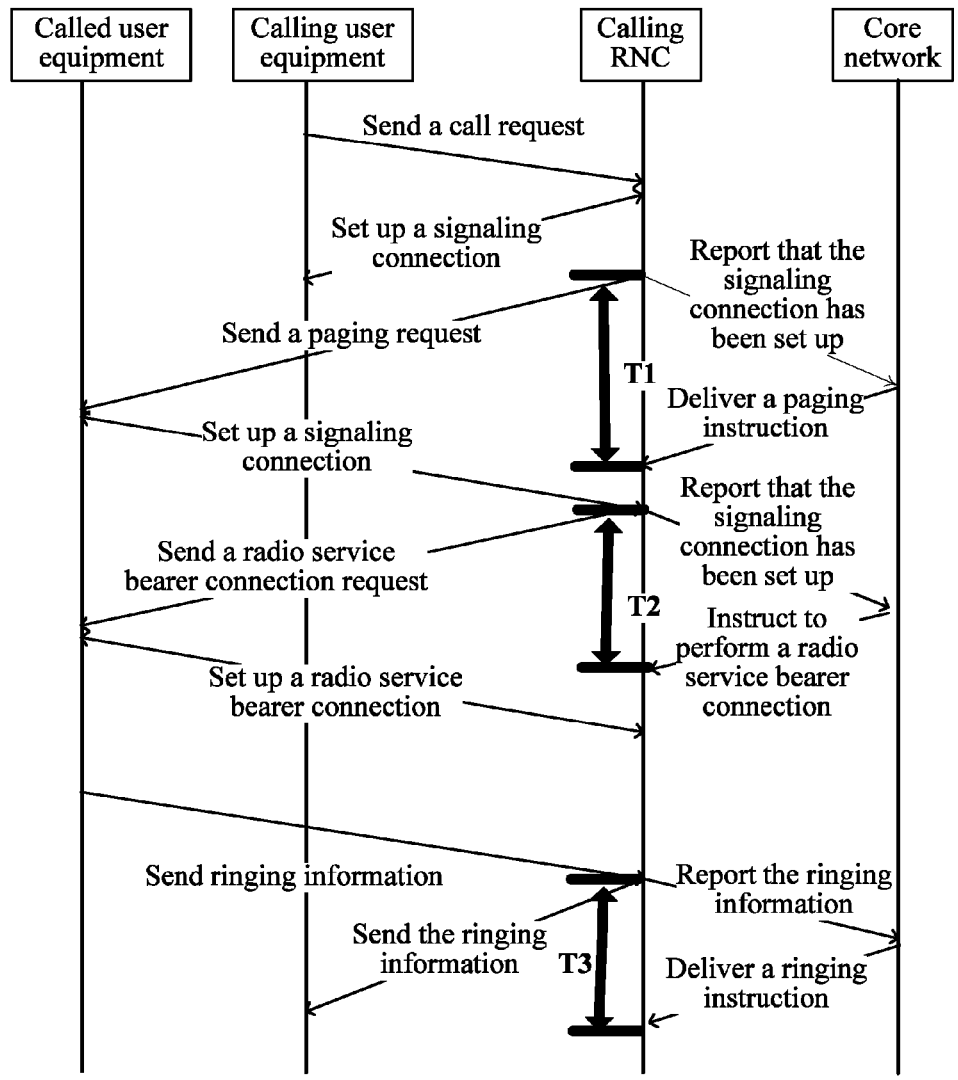
FIG. 4 is a flowchart of setting up a voice service when a calling user equipment and a called user equipment are located in a same radio network controller according to an embodiment of the present invention.

Using a UMTS system as an example, in the UMTS system, an access network (RAN) device includes a radio network controller (RNC) and a base station (NodeB). In a specific implementation process, Using the UMTS system as an example, an RAN includes multiple RNCs, and when a calling UE and a called UE are located in a same RNC in the RAN: referring to FIG. 4, FIG. 4 is a flowchart of setting up a voice service when a calling user equipment and a called user equipment are located in a same radio network controller according to an embodiment of the present invention.

First, a calling RNC determines, based on a called user communication identity of a called UE that is carried in the call request, a target RNC in which the called UE is located, and determines whether a calling UE and the called UE are located in a same RNC in an RAN.

If the calling UE and the called UE are located in a same RNC in the RAN, based on the called user communication identity, the calling RNC generates a paging request and sends the paging request to the called UE, thereby omitting communication between the calling RNC and the target RNC.

Further, after the access network device sets up a signaling connection to the called user equipment according to step S304, the method further includes: generating, by the access network device, a radio service bearer connection message before the access network device receives an instruction that is sent by the core network device and that instructs the access network device to set up a radio service bearer connection to the called user equipment; sending, by the access network device, the generated radio service bearer connection message to the called user equipment; and setting up, by the access network device, a radio service bearer connection to the called user equipment based on the radio service bearer connection message.

In a specific implementation process, using a UMTS as an example, in the 3Gpp protocol, that a core network device instructs an RAN to set up a radio service bearer connection to a called UE is specifically that: the core network device instructs the RAN to set up a radio access bearer (RAB) with the called UE, where a message that is delivered by the core network device to the RAN and instructs to set up the RAB is an RAB Assignment Request message. Still using a GSM as an example, in the protocol, that a core network device instructs an access network device to set up a radio service bearer connection to a called user equipment is specifically that: the core network device instructs to perform traffic channel (TCH) assignment between the access network device and the called user equipment.

In a specific implementation process, the radio service bearer connection message is a message that is delivered by the access network device to the user equipment and that is used to instruct the user equipment to set up a radio bearer with the access network device. Using a UMTS as an example, in the 3Gpp protocol, a radio service bearer connection between an RAN and a called UE is referred to as a radio bearer (RB), and a message that is delivered by the RAN to the called UE and instructs to set up the radio bearer is an RB setup message.

Further, after the access network device sets up a signaling connection to the called user equipment according to step S304, the method further includes: before the access network device receives ringing information sent by the core network device, receiving, by the access network device, the ringing information sent by the called user equipment; and sending, by the access network device, the ringing information to the calling user equipment before the access network device receives the ringing information sent by the core network device.

In a specific implementation process, the ringing information is information that notifies the calling user equipment that a connection has been completed, that is, a service bearer connection between the calling user equipment and the called user equipment has been set up, and that prompts the calling user equipment to play a ringtone such as "du . . . du . . . ", and the ringing information is referred to as Alerting in the protocol.

In a specific implementation process, still using a UMTS system as an example, when the calling UE and the called UE are located in a same RNC in an RAN, as shown in FIG. 4, the calling RNC directly sends the received ringing information to the calling UE.

A second case is that the calling radio network controller and the target radio network controller are different controllers.

That is, in step S303, that the access network device sends the generated paging request to the called user equipment includes that: the access network device determines, based on the user communication identity, a target radio network controller with which the called user equipment communicates; and when the target radio network controller with which the called user equipment communicates and the calling radio network controller with which the calling user equipment communicates are not a same radio network controller, the access network device sends the generated paging request to the target radio network controller, and then the paging request is sent to the called user equipment by using the target radio network controller, where the access network device is the calling radio network controller.

Figure 5:
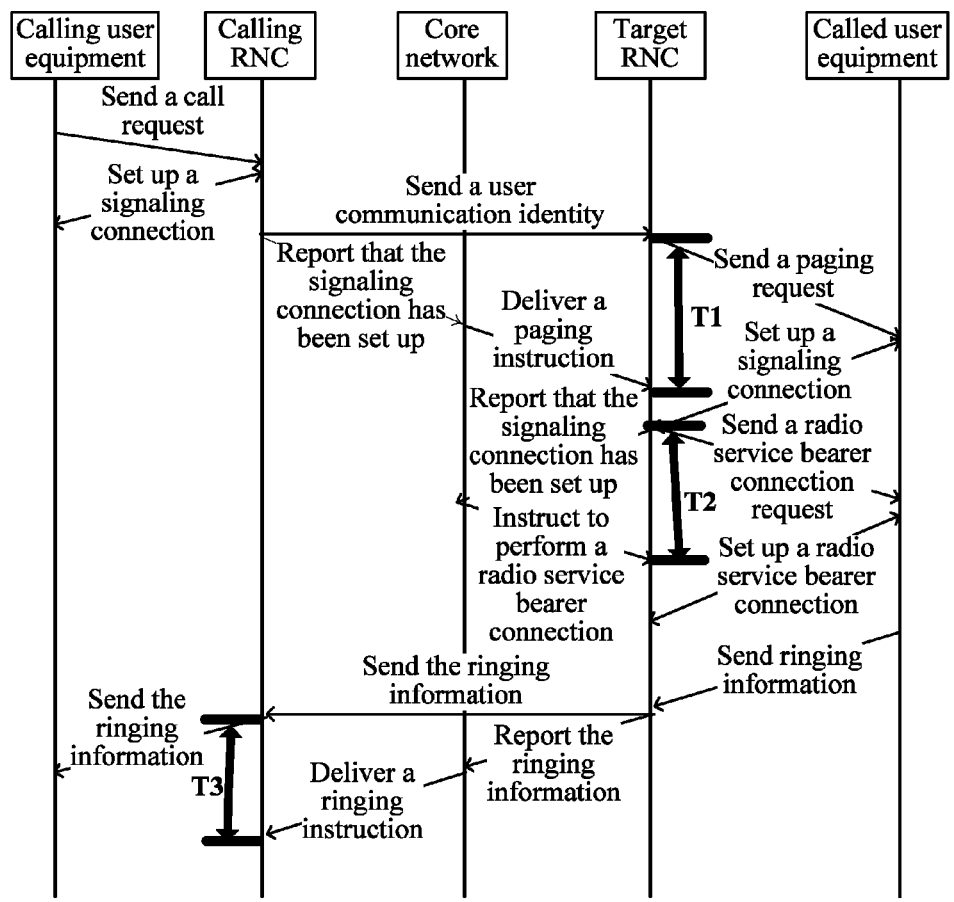
FIG. 5 is a flowchart of setting up a voice service when a calling user equipment and a called user equipment are located in different radio network controllers according to an embodiment of the present invention.

Still using a UMTS system as an example, when the calling UE and the called UE are located in different RNCs: referring to FIG. 5, FIG. 5 is a flowchart of setting up a voice service when a calling user equipment and a called user equipment are located in different radio network controllers according to an embodiment of the present invention.

First, a calling RNC determines, based on a called user communication identity of a called UE that is carried in a call request, a target RNC in which the called UE is located, and determines whether a calling UE and the called UE are located in a same RNC in an RAN.

If the calling UE and the called UE are located in different RNCs in the RAN, the calling RNC sends the called user communication identity to the target RNC, and then, based on the received called user communication identity, the target RNC is used to generate a paging request and send the paging request to the called UE.

In a specific implementation process, communication between the calling RNC and the target RNC is implemented through an Iur interface between the two RNCs, where the Iur interface is a logical interface between the RNCs and is an interface that is used for signaling and data exchange between the RNCs.

Further, after the access network device sets up a signaling connection to the called user equipment according to step S304, the method further includes: before the access network device receives ringing information sent by the core network device, receiving, by the access network device, the ringing information sent by the target radio network controller with which the called user equipment communicates; and sending the ringing information to the calling user equipment before the access network device receives the ringing information sent by the core network device.

In a specific implementation process, using a UMTS system as an example, when the calling UE and the called UE are located in different RNCs in an RAN, as shown in FIG. 5, the calling RNC receives the ringing information sent by the target RNC, and the calling RNC sends the ringing information to the calling UE.

In a specific implementation process, the calling RNC receives, through the Iur interface between the two RNCs, the ringing information sent by the target RNC.

Specifically, as shown in FIG. 4 and FIG. 5, after the access network device receives the call request, on the one hand, the access network device reports to the core network device according to an original serial process; on the other hand, the access network device concurrently sends the paging request to the called user equipment before the core network device delivers the paging message, so as to start setting up a signaling connection to the called user equipment. That is, when the communications system performs steps of reporting, by the access network device, to the core network device and delivering, by the core network device, the paging message to the access network device, the access network device concurrently sets up a signaling connection to the called user equipment, so that when the core network device delivers the paging message to the access network device, the access network device has completed or partly completed the setup of the signaling connection to the called user equipment, which can save a period of time T1 spent for performing the steps, which are shown in FIG. 4 and FIG. 5, of reporting, by the access network device, to the core network device and delivering, by the core network device, the paging message to the access network device, thereby shortening a voice service setup delay.

Further, as shown in FIG. 4 and FIG. 5, after the access network device sets up a signaling connection to the called user equipment, on the one hand, the access network device reports to the core network device according to an original serial process; on the other hand, the access network device concurrently sends the radio service bearer connection message to the called user equipment before the core network device instructs the access network device to set up a radio service bearer connection to the called user equipment, so as to start setting up a radio service bearer connection to the called user equipment. That is, when the communications system performs the steps of reporting, by the access network device, to the core network device and instructing, by the core network device, the access network device to set up a radio service bearer connection to the called user equipment, the access network device concurrently sets up a radio service bearer connection to the called user equipment, so that when the core network device instructs the access network device to set up a radio service bearer connection to the called user equipment, the access network device has completed or partly completed the setup of the radio service bearer connection to the called user equipment, which can save a period of time T2 spent for performing the steps, which are in FIG. 4 and FIG. 5, of reporting, by the access network device, to the core network device and instructing, by the core network device, to set up a radio service bearer connection, thereby shortening a voice service setup delay.

Further, in this embodiment of this application, the generating, by the access network device, a paging request based on the user communication identity includes: acquiring, by the access network device, based on the user communication identity, connection state information of the called user equipment; determining, by the access network device, a paging request type corresponding to the connection state information; and generating, by the access network device the paging request based on the called user communication identity, where the paging request is of the paging request type.

Specifically, the access network device may generate different types of paging requests and send the different types of paging requests to the called user equipment according to different connection states of the called user equipment, so as to ensure that a paging request sent by the access network device to the called user equipment can trigger the called user equipment to set up a signaling connection to the access network device.

In the following descriptions, still using a UMTS as an example, a step of generating and sending, by an RAN, a paging request to the called UE includes: determining, by the RAN, based on the called user communication identity of the called UE that is carried in the call request, the target RNC in which the called UE is located; acquiring, by the RAN, connection state information of the called UE by using the target RNC determining, by the RAN, a paging request type corresponding to the connection state information; and based on the called user communication identity, generating, by the RAN, the paging request and sending the paging request to the called UE, where the paging request is of the paging request type.

For example, when the RAN learns that the called UE is in any one of the following states: an idle state, a Cell_PCH state, and a URA_PCH state, the RAN generates Paging Type1 and sends Paging Type1 to the called UE.

When the RAN learns that the called UE is in a Cell_FACH state, the RAN generates Paging Type2 and sends Paging Type2 to the called UE.

Based on a same inventive concept, the present invention provides another embodiment. For details, reference may be made to Embodiment 2.

Embodiment 2

In Embodiment 2, an access network device is provided, where the access network device is a target radio network controller with which a called user equipment communicates. A calling radio network controller with which a calling user equipment communicates and the target radio network controller are different controllers.

Figure 6:
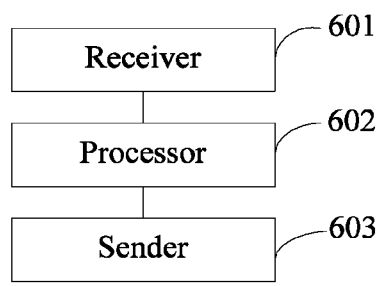
FIG. 6 is a schematic structural diagram of an access network device according to another embodiment of the present invention.

As shown in FIG. 6, the access network device includes: a receiver 601, configured to receive a user communication identity of a called user equipment that is sent by a calling radio network controller with which a calling user equipment communicates; a processor 602, configured to generate a paging request based on the user communication identity before the receiver 601 receives a paging message sent by a core network device, where the processor 602 is further configured to set up a signaling connection to the called user equipment based on the paging request; and a sender 603, configured to send the paging request generated by the processor 602 to the called user equipment.

A specific connection relationship is that: the receiver 601 is connected to the processor 602, and the sender 603 is also connected to the processor 602.

After receiving the user communication identity of the called user equipment that is sent by the calling radio network controller, the access network device actively pages the called user equipment, so as to start setting up a signaling connection to the called user equipment before the core network device delivers the paging message, which saves a time of waiting for the core network device to deliver the paging message to the access network device, thereby achieving a technical effect of shortening a voice service setup delay.

In this embodiment, the receiver 601 is further configured to receive an instruction that is sent by the core network device and that instructs the access network device to set up a radio service bearer connection to the called user equipment; the processor 602 is further configured to generate a radio service bearer connection message before the receiver 601 receives the instruction, which is sent by the core network device, of setting up a radio service bearer connection; the sender 603 is further configured to send the radio service bearer connection message generated by the processor 602 to the called user equipment; and the processor 602 is further configured to set up a radio service bearer connection to the called user equipment based on the radio service bearer connection message.

In this embodiment, the receiver 601 is further configured to receive ringing information sent by the called user equipment; and the sender 603 is further configured to send the ringing information to the calling radio network controller before or when sending the ringing information to the core network device, where the access network device is a target radio network controller with which the called user equipment communicates.

Corresponding to the access network device provided in Embodiment 2, this embodiment further provides a communication method, where the communication method can be applied to the foregoing access network device.

Figure 7:
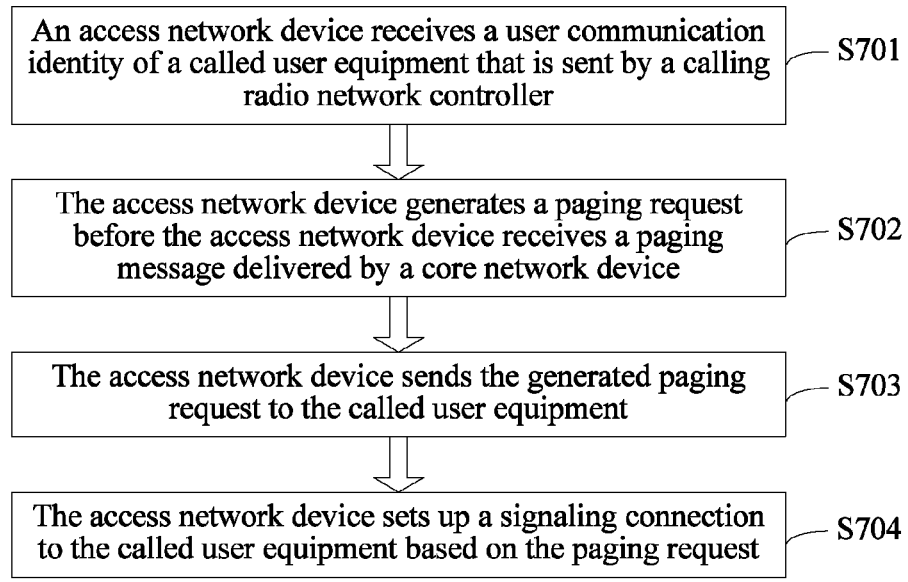
FIG. 7 is a flowchart of a communication method according to another embodiment of the present invention.

As shown in FIG. 7, the communication method includes the following steps.

Step S701: An access network device receives a user communication identity of a called user equipment that is sent by a calling radio network controller with which a calling user equipment communicates.

Step S702: The access network device generates a paging request based on the user communication identity before the access network device receives a paging message sent by a core network device.

Step S703: The access network device sends the generated paging request to the called user equipment.

Step S704: The access network device sets up a signaling connection to the called user equipment based on the paging request.

In this embodiment, after step S704 of setting up, by the access network device, a signaling connection to the called user equipment, the method further includes: generating, by the access network device, a radio service bearer connection message before the access network device receives an instruction that is sent by the core network device and that instructs the access network device to set up a radio service bearer connection to the called user equipment; sending, by the access network device, the generated radio service bearer connection message to the called user equipment; and setting up, by the access network device, a radio service bearer connection to the called user equipment based on the radio service bearer connection message.

In this embodiment, after step S704 of setting up, by the access network device, a signaling connection to the called user equipment, the method further includes: receiving, by the access network device, ringing information sent by the called user equipment; and sending, by the access network device, the ringing information to the calling radio network controller before and when the access network device sends the ringing information to the core network device, where the access network device is a target radio network controller with which the called user equipment communicates.

The access network device and the communication method that are provided in Embodiment 2 and the access network device and the communication method that are provided in Embodiment 1 are two aspects based on a same inventive concept, and an implementation process in which the access network device is a calling radio network controller is described in detail above; therefore, persons skilled in the art may clearly understand an implementation process in which the access network device is a target radio network controller in this embodiment. For briefness of this application, details are not repeatedly described herein.

Embodiment 3

In Embodiment 3, an access network device is provided, where the access network device is a target radio network controller with which a called user equipment communicates.

Figure 8:
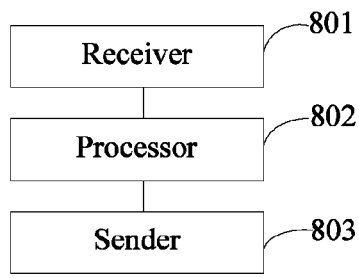
FIG. 8 is a schematic structural diagram of an access network device according to still another embodiment of the present invention.

As shown in FIG. 8, the access network device includes: a receiver 801, configured to receive an instruction that is sent by a core network device and instructs the access network device to set up a radio service bearer connection to a called user equipment; a processor 802, configured to set up a signaling connection to the called user equipment, and generate a radio service bearer connection message before the receiver 801 receives the instruction of setting up a radio service bearer connection; and a sender 803, configured to send the radio service bearer connection message generated by the processor 802 to the called user equipment, where the processor 802 is further configured to set up a radio service bearer connection to the called user equipment based on the radio service bearer connection message.

A specific connection relationship is that: the receiver 801 is connected to the processor 802, and the sender 803 is also connected to the processor 802.

After the access network device detects that the access network device has set up a signaling connection to the called user equipment, the access network device actively generates the radio service bearer connection message and sends the radio service bearer connection message to the called user equipment, so as to start setting up a radio service bearer connection to the called user equipment before the core network device instructs the access network device to set up a radio service bearer connection to the called user equipment, which saves a time between a time at which the access network device reports to the core network device and a time at which the core network device instructs the access network device to set up a radio service bearer connection to the called user equipment, thereby achieving a technical effect of shortening a voice service setup delay.

Corresponding to the access network device provided in Embodiment 3, this embodiment further provides a communication method, where the communication method can be applied to the foregoing access network device.

Figure 9:
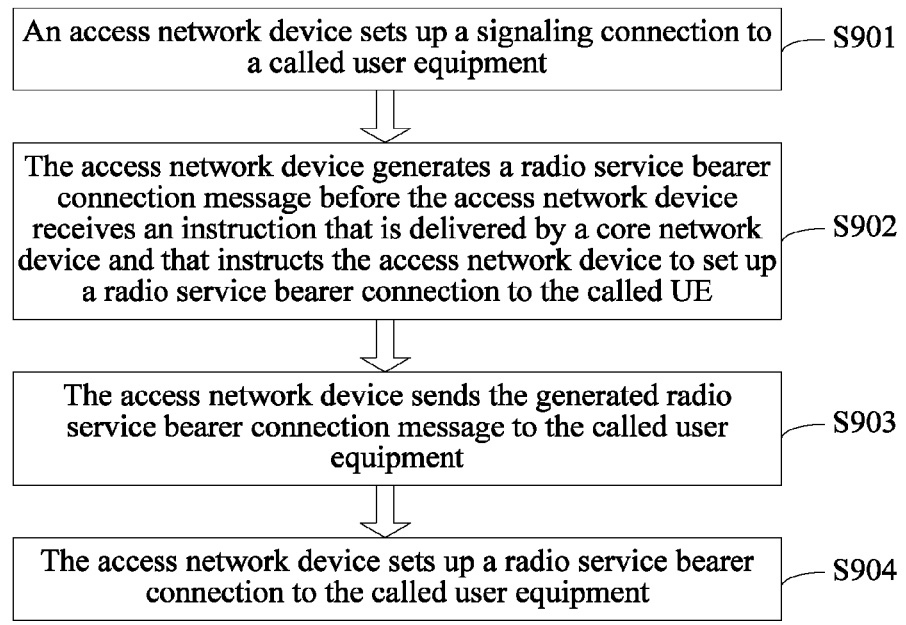
FIG. 9 is a flowchart of a communication method according to still another embodiment of the present invention.

As shown in FIG. 9, the communication method includes the following steps.

Step S901: An access network device sets up a signaling connection to a called user equipment.

Step S902: The access network device generates a radio service bearer connection message before the access network device receives an instruction that is delivered by a core network device and that instructs the access network device to set up a radio service bearer connection to the called user equipment.

Step S903: The access network device sends the generated radio service bearer connection message to the called user equipment.

Step S904: The access network device sets up a radio service bearer connection to the called user equipment based on the radio service bearer connection message.

In a specific implementation process, before step S901 of setting up, by an access network device, a signaling connection to a called user equipment, the communication method further includes: setting up, by the access network device, a signaling connection to a calling user equipment; and receiving, by the access network device, a call request sent by the calling user equipment.

This embodiment is applicable to a case in which a calling radio network controller with which a calling user equipment communicates and a target radio network controller are the same controllers, and this embodiment is also applicable to a case in which the calling radio network controller and the target radio network controller are different controllers.

Based on a same inventive concept, the present invention provides another embodiment. For details, reference may be made to Embodiment 4.

Embodiment 4

In Embodiment 4, an access network device is provided, where the access network device is a calling radio network controller with which a calling user equipment communicates. The calling radio network controller and a target radio network controller with which a called user equipment communicates are different controllers.

Figure 10:
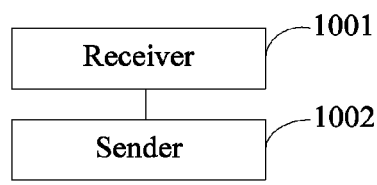
FIG. 10 is a schematic structural diagram of an access network device according to yet another embodiment of the present invention.

As shown in FIG. 10, the access network device includes: a receiver 1001, configured to: before receiving ringing information sent by a core network device, receive the ringing information sent by a target radio network controller; and a sender 1002, configured to send the ringing information to a calling user equipment before the receiver 1001 receives the ringing information sent by the core network device.

Corresponding to the access network device provided in Embodiment 4, this embodiment further provides a communication method, where the communication method can be applied to the foregoing access network device.

Figure 11:
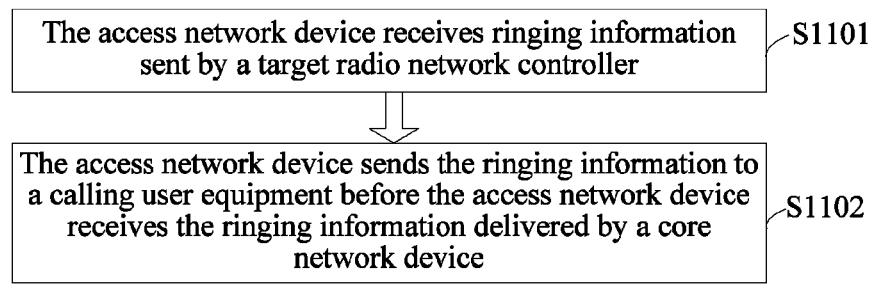
FIG. 11 is a flowchart of a communication method according to yet another embodiment of the present invention.

As shown in FIG. 11, the communication method includes the following steps.

Step Snot Before an access network device receives ringing information sent by a core network device, the access network device receives the ringing information sent by a target radio network controller.

Step S1102: The access network device sends the ringing information to a calling user equipment before the access network device receives the ringing information sent by the core network device.

Based on a same inventive concept, the present invention provides another embodiment. For details, reference may be made to Embodiment 5.

Embodiment 5

In Embodiment 5, an access network device is provided, where the access network device is a target radio network controller with which a called user equipment communicates. The calling radio network controller and the target radio network controller with which the called user equipment communicates are different controllers.

Figure 12:
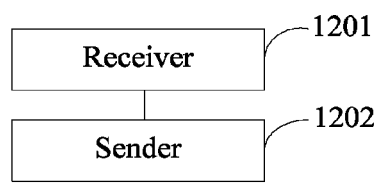
FIG. 12 is a schematic structural diagram of an access network device according to still yet another embodiment of the present invention.

As shown in FIG. 12, the access network device includes: a receiver 1201, configured to receive ringing information sent by a called user equipment; and a sender 1202, configured to send the ringing information to a calling radio network controller before or when sending the ringing information to a core network device.

Corresponding to the access network device provided in Embodiment 5, this embodiment further provides a communication method, where the communication method can be applied to the foregoing access network device.

Figure 13:
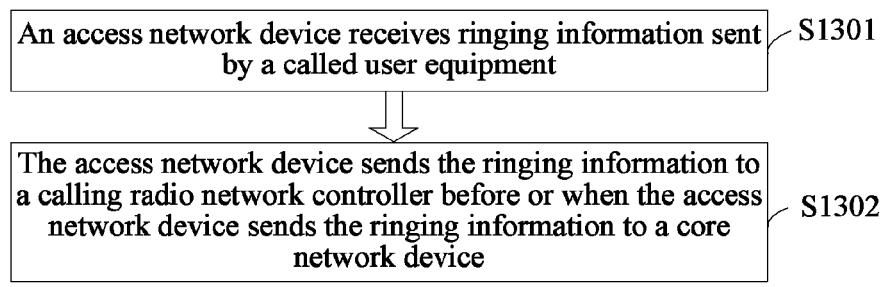
FIG. 13 is a flowchart of a communication method according to still yet another embodiment of the present invention.

As shown in FIG. 13, the communication method includes the following steps.

Step S1301: The access network device receives ringing information sent by a called user equipment.

Step S1302: The access network device sends the ringing information to a calling radio network controller before or when the access network device sends the ringing information to a core network device.

Based on a same inventive concept, the present invention provides another embodiment. For details, reference may be made to Embodiment 6.

Embodiment 6

In Embodiment 6, an access network device is provided, which is applicable to a case in which a calling radio network controller and a target radio network controller with which a called user equipment communicates are a same controller.

Figure 14:
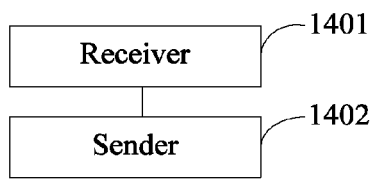
FIG. 14 is a schematic structural diagram of an access network device according to a further embodiment of the present invention.

As shown in FIG. 14, the access network device includes: a receiver 1401, configured to: before receiving ringing information sent by a core network device, receive the ringing information sent by a called user equipment; and a sender 1402, configured to send the ringing information to a calling user equipment before the receiver 1401 receives the ringing information sent by the core network device.

Corresponding to the access network device provided in Embodiment 5, this embodiment further provides a communication method, where the communication method can be applied to the foregoing access network device.

Figure 15:
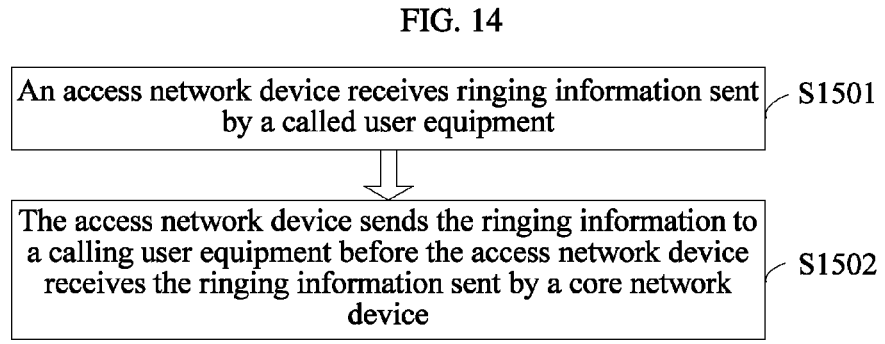
FIG. 15 is a flowchart of a communication method according to a further embodiment of the present invention.

As shown in FIG. 15, the communication method includes the following steps.

Step S1501: Before the access network device receives ringing information sent by a core network device, the access network device receives the ringing information sent by a called user equipment.

Step S1502: The access network device sends the ringing information to a calling user equipment before the access network device receives the ringing information sent by the core network device.

Certainly, in a specific implementation process, any one of or a combination of the following three solutions, that is, the access network device actively pages the called user equipment without waiting for the core network device to deliver a paging message; the access network device actively sends a radio service bearer connection message to the called user equipment without waiting for the core network device to deliver an instruction of setting up a radio service bearer connection; and the access network device actively sends the ringing information to the calling user equipment without waiting for the core network device to deliver the ringing information, may be selected for implementation, which is not limited in this embodiment.

In the several embodiments provided in this application, it should be understood that: the receiver may be a receiving unit or a receiving module; the processor may be a processing unit or a processing module; and the sender may be a sending unit or a sending module.

The technical solutions in the foregoing embodiments of this application include at least one of the following technical effects or advantages.

In the embodiments of the present invention, an access network device actively delivers a message to a calling user equipment or a called user equipment concurrently before receiving an instruction of a core network device, which achieves a technical effect of shortening a voice service setup delay.

Although exemplary embodiments of the present invention have been described, persons skilled in the art can make changes and modifications to these embodiments once they learn the basic inventive concept. Therefore, the following claims are intended to be construed as to cover the exemplary embodiments and all changes and modifications falling within the scope of the present invention.

Obviously, persons skilled in the art can make various modifications and variations to the present invention without departing from the scope of the present invention. In this way, the present invention is intended to cover these modifications and variations provided that these modifications and variations to the present invention fall within the scope of the claims of the present invention and their equivalent technologies.

It may be clearly understood by persons skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) to perform some of the steps of the methods described in the embodiments of the present invention. The foregoing storage medium includes: any medium that can store program code, such as a USB flash drive, a removable hard disk, a read-only memory (ROM for short), a random access memory (RAM for short), a magnetic disk, or an optical disc.

Finally, it should be noted that the foregoing embodiments are merely intended for describing the technical solutions of the present invention rather than limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, as long as such modifications or replacements do not make the essence of corresponding technical solutions to depart from the scope of the technical solutions of the embodiments of the present invention.

What is claimed is:

1. An access network device, comprising:
    a receiver, configured to receive a call request sent by a calling user equipment, wherein the call request carries a user communication identity of a called user equipment;
    a processor, configured to generate a paging request based on the user communication identity before the receiver receives a paging message sent by a core network device, wherein the processor is further configured to set up a signaling connection to the called user equipment based on the paging request; and
    a sender, configured to send the paging request generated by the processor to the called user equipment.

2. The access network device according to claim 1, wherein the processor is further configured to determine, based on the user communication identity, a target radio network controller with which the called user equipment communicates; and
    wherein the sender being configured to send the paging request generated by the processor to the called user equipment comprises the sender being configured to:
        when the target radio network controller with which the called user equipment communicates and a calling radio network controller with which the calling user equipment communicates are a same radio network controller, send the paging request generated by the processor to the called user equipment;
    wherein the access network device is the calling radio network controller.

3. The access network device according to claim 1, wherein:
    the receiver is further configured to: before receiving ringing information sent by the core network device, receive the ringing information sent by the called user equipment; and
    the sender is further configured to send the ringing information to the calling user equipment before the receiver receives the ringing information sent by the core network device.

4. The access network device according to claim 1, wherein:
    the receiver is further configured to receive an instruction that is sent by the core network device and that instructs the access network device to set up a radio service bearer connection to the called user equipment;
    the processor is further configured to set up a signaling connection to the called user equipment, and generate a radio service bearer connection message before the receiver receives the instruction of setting up a radio service bearer connection;
    the sender is further configured to send the radio service bearer connection message generated by the processor to the called user equipment; and
    the processor is further configured to set up a radio service bearer connection to the called user equipment based on the radio service bearer connection message.

5. The access network device according to claim 1, wherein the processor is further configured to determine, based on the user communication identity, a target radio network controller with which the called user equipment communicates;
    wherein the sender being configured to send the paging request generated by the processor to the called user equipment comprises the sender being configured to:
        when the target radio network controller with which the called user equipment communicates and a calling radio network controller with which the calling user equipment communicates are not a same radio network controller, send the paging request generated by the processor to the target radio network controller, so that the paging request is then sent to the called user equipment using the target radio network controller, and
    wherein the access network device is the calling radio network controller.

6. The access network device according to claim 1, wherein:
    the receiver is further configured to: before receiving ringing information sent by the core network device, receive the ringing information sent by the target radio network controller with which the called user equipment communicates; and
    the sender is further configured to send the ringing information to the calling user equipment before the receiver receives the ringing information sent by the core network device.

7. The access network device according to claim 1, wherein the processor being configured to generate a paging request based on the user communication identity before the receiver receives a paging message sent by a core network device comprises the processor being configured to:
    acquire, based on the user communication identity of the called user equipment that is carried in the call request, connection state information of the called user equipment before the receiver receives the paging message sent by the core network device, and determine a paging request type corresponding to the connection state information, wherein the paging request is of the paging request type.

8. An access network device, comprising:
    a receiver, configured to receive a user communication identity of a called user equipment that is sent by a calling radio network controller with which a calling user equipment communicates;
    a processor, configured to generate a paging request based on the user communication identity before the receiver receives a paging message sent by a core network device, wherein the processor is further configured to set up a signaling connection to the called user equipment based on the paging request; and
    a sender, configured to send the paging request generated by the processor to the called user equipment.

9. The access network device according to claim 8, wherein:
    the receiver is further configured to receive an instruction that is sent by the core network device that instructs the access network device to set up a radio service bearer connection to the called user equipment;
    the processor is further configured to generate a radio service bearer connection message before the receiver receives the instruction, which is sent by the core network device, of setting up the radio service bearer connection;
    the sender is further configured to send the radio service bearer connection message generated by the processor to the called user equipment; and
    the processor is further configured to set up a radio service bearer connection to the called user equipment based on the radio service bearer connection message.

10. The access network device according to claim 8, wherein:
    the receiver is further configured to receive ringing information sent by the called user equipment; and
    the sender is further configured to send the ringing information to the calling radio network controller before or when sending the ringing information to the core network device, wherein the access network device is a target radio network controller with which the called user equipment communicates.

11. A method, comprising:
    receiving, by an access network device, a call request sent by a calling user equipment, wherein the call request carries a user communication identity of a called user equipment;
    generating, by the access network device, a paging request based on the user communication identity before the access network device receives a paging message sent by a core network device;
    sending, by the access network device, the generated paging request to the called user equipment; and
    setting up, by the access network device, a signaling connection to the called user equipment based on the paging request.

12. The method according to claim 11, wherein sending, by the access network device, the generated paging request to the called user equipment comprises:
    determining, by the access network device, based on the user communication identity, a target radio network controller with which the called user equipment communicates; and
    when the target radio network controller with which the called user equipment communicates and a calling radio network controller with which the calling user equipment communicates are a same radio network controller, sending, by the access network device, the generated paging request to the called user equipment, wherein the access network device is the calling radio network controller.

13. The method according to claim 11, wherein after setting up the signaling connection to the called user equipment based on the paging request, the method further comprises:
    before the access network device receives ringing information sent by the core network device, receiving, by the access network device, the ringing information sent by the called user equipment; and
    sending, by the access network device, the ringing information to the calling user equipment before the access network device receives the ringing information sent by the core network device.

14. The method according to claim 11, wherein after setting up the signaling connection to the called user equipment based on the paging request, the method further comprises:
    generating, by the access network device, a radio service bearer connection message before the access network device receives an instruction that is sent by the core network device that instructs the access network device to set up a radio service bearer connection to the called user equipment;

sending, by the access network device, the generated radio service bearer connection message to the called user equipment; and setting up, by the access network device, a radio service bearer connection to the called user equipment based on the radio service bearer connection message.

15. The method according to claim 11, wherein sending the generated paging request to the called user equipment comprises:

determining, by the access network device, based on the user communication identity, a target radio network controller with which the called user equipment communicates; and when the target radio network controller with which the called user equipment communicates and a calling radio network controller with which the calling user equipment communicates are not a same radio network controller, sending, by the access network device, the generated paging request to the target radio network controller, and then sending the paging request to the called user equipment using the target radio network controller, wherein the access network device is the calling radio network controller.

16. The method according to claim 11, wherein after setting up the signaling connection to the called user equipment based on the paging request, the method further comprises:

before the access network device receives ringing information sent by the core network device, receiving, by the access network device, the ringing information sent by the target radio network controller with which the called user equipment communicates; and sending the ringing information to the calling user equipment before the access network device receives the ringing information sent by the core network device.

17. The method according to claim 11, wherein generating the paging request based on the user communication identity comprises:

acquiring, by the access network device, based on the user communication identity, connection state information of the called user equipment;

determining, by the access network device, a paging request type corresponding to the connection state information; and generating, by the access network device, the paging request based on the called user communication identity, wherein the paging request is of the paging request type.

18. A method, comprising:

receiving, by an access network device, a user communication identity of a called user equipment that is sent by a calling radio network controller with which a calling user equipment communicates;

generating, by the access network device, a paging request based on the user communication identity before the access network device receives a paging message sent by a core network device;

sending, by the access network device, the generated paging request to the called user equipment; and setting up, by the access network device, a signaling connection to the called user equipment based on the paging request.

19. The method according to claim 18, wherein after setting up the signaling connection to the called user equipment based on the paging request, the method further comprises:

generating, by the access network device, a radio service bearer connection message before the access network device receives an instruction that is sent by the core network device and that instructs the access network device to set up a radio service bearer connection to the called user equipment;

sending, by the access network device, the generated radio service bearer connection message to the called user equipment; and setting up, by the access network device, a radio service bearer connection to the called user equipment based on the radio service bearer connection message.

20. The method according to claim 18, wherein after setting up the signaling connection to the called user equipment based on the paging request, the method further comprises:

receiving, by the access network device, ringing information sent by the called user equipment; and sending, by the access network device, the ringing information to the calling radio network controller before and when the access network device sends the ringing information to the core network device, wherein the access network device is a target radio network controller with which the called user equipment communicates.

* * * * *